United States Patent
Richter

(10) Patent No.: US 8,848,959 B1
(45) Date of Patent: Sep. 30, 2014

(54) INVISIBLE RETENTION DEVICE FOR HEARING AIDS

(71) Applicant: Milton Richter, Monticello, NY (US)

(72) Inventor: Milton Richter, Monticello, NY (US)

(*) Notice: Subject to any disclaimer, the term of this patent is extended or adjusted under 35 U.S.C. 154(b) by 0 days.

(21) Appl. No.: 13/986,809

(22) Filed: Jun. 7, 2013

(51) Int. Cl.
- *H04R 25/00* (2006.01)
- *A47G 1/17* (2006.01)
- *H04R 1/10* (2006.01)
- *G02C 11/06* (2006.01)

(52) U.S. Cl.
CPC .............. *H04R 25/60* (2013.01); *H04R 1/105* (2013.01); *G02C 11/06* (2013.01); *H04R 2225/63* (2013.01); *H04R 1/1066* (2013.01)
USPC ...... 381/330; 381/324; 248/205.4; 248/230.8

(58) Field of Classification Search
CPC ...... H04R 25/60; H04R 25/65; H04R 1/1066; H04R 5/0335; H04R 1/105; H04R 2225/63; G02C 5/143; G02C 11/02; G02C 11/06; A45F 5/02
USPC ......... 381/301, 333, 376, 388, 390, 322, 324, 381/327, 329; D14/203.5, 224; 248/205.2, 248/205.3, 205.4, 230.8, 505, 506
See application file for complete search history.

(56) References Cited

U.S. PATENT DOCUMENTS

| | | | |
|---|---|---|---|
| 5,327,499 A | 7/1994 | Sohayda | |
| 8,186,022 B2* | 5/2012 | Roser | 24/3.12 |
| 2007/0217641 A1 | 9/2007 | Rosal | |
| 2010/0122435 A1 | 5/2010 | Markham | |
| 2011/0121042 A1* | 5/2011 | Weiss | 224/181 |
| 2013/0239301 A1* | 9/2013 | Broderick | 2/410 |

* cited by examiner

*Primary Examiner* — Jesse Elbin
(74) *Attorney, Agent, or Firm* — Sandra M. Kotin

(57) ABSTRACT

A safety device reversibly attachable to any hearing aid of a type having a behind the ear unit with a connecting member and an ear bud prevents the hearing aid from being lost or damaged if the unit is dislodged from behind the ear of the wearer. The device is virtually invisible so as not to draw attention to the fact that the wearer is using a hearing aid. One portion of a two part attaching strip is adhered to the behind the ear unit. The second portion can be securely and reversibly united with the first portion to attach or remove the device from the hearing aid. A transparent filament is integral with the second portion at one end and to a securing plate at the opposing end. The securing plate can receive the temple of a pair of glasses or another retaining article worn on the person of the wearer. A slit in the securing plate is opened by pressure on the side rim enabling the insertion of the retaining article which is held securely when the pressure is removed and the slit closed around it.

18 Claims, 2 Drawing Sheets

INVISIBLE RETENTION DEVICE FOR HEARING AIDS

FIELD OF THE INVENTION

The instant invention relates to an invisible retaining device to prevent the loss of a hearing aid.

BACKGROUND OF THE INVENTION

Hearing aids have gotten progressively smaller and less visible. One of the most prevalent is a curved unit that rests behind the ear with a connecting line to an ear bud that is inserted into the ear. The ergonomic shape of the curved unit is designed to be placed behind the ear and to remain there with considerable security. However, if not properly seated or if the wearer is physically active, the unit may become dislodged and fall away resulting in possible damage to the unit. If this is not noticed at once the unit is lost. The small compact units are quite expensive to replace and the user may then be without the hearing aid until a replacement can be obtained.

There have been very few attempts to solve this problem. Rosal, in U.S. Patent Application Publication No. 2007/0217641, addressed this issue as well as the problem of the discomfort caused by wearing the hearing aid for long periods of time. He encases the behind the ear unit in a soft, absorbent fabric sheath or sleeve. An elastic cord is attached to the sleeve on one side of the wearer and extends across the front of the wearer to the sleeve encasing the behind the ear unit on the other side. The center of the cord hangs down in front of the wearer and has an attached clip. The clip can be affixed to the clothing so that if the unit on one side is dislodged it will hang from the elastic cord, will not pull down the opposing unit, and cannot be lost. This entire system is very visible, clumsy, and could be quite annoying to the wearer.

Sohayda, in U.S. Pat. No. 5,327,499, teaches a chain, one end of which is linked to an ear bud style hearing aid. The opposing end of the chain is held in front of the ear by the post of an earring designed to by worn in a pierced ear. Though the chain is relatively short, it is made of plastic and therefore quite visible and does not add to the aesthetic of the earring. It also requires the ear bud to be manufactured with a loop or bar of some type to which the chain can be attached. Additionally, this device is only used with a post type earring and therefore is not usable by most males that may require a hearing aid.

Others have disclosed the use of a tether having an adjustable loop at one end to encircle an ear bud or other hands free listening device and an alligator clip at the other end. The tether can be made of a chain, stainless steel wire or coated stainless steel wire (Roser, U.S. Pat. No. 8,186,022), or a nylon strap or other heavy ribbon, nylon cord with beads attached, or a chain with charms attached (U.S. Patent Application Publication No. 2010/0122435). These devices are designed to be attached to clothing on the person of the wearer or to a personal article such as a briefcase or purse, are clearly visible, and can get in the way of the user when attached to clothing. Additionally, the alligator clip may be pulled away if not carefully attached to the clothing or personal article.

There is a need for a safety device that is virtually invisible to retain a hearing aid and yet not call attention to the fact that the wearer is using a hearing aid. There is a need for such a safety device that is strong and will hold the hearing aid in a secure manner and cannot slip off the retaining article to which it is attached.

BRIEF SUMMARY OF THE INVENTION

The present invention provides a safety device to retain a hearing aid on the person of the wearer if it becomes dislodged and falls from behind the ear. The device can be reversibly attached to any hearing aid and is virtually invisible. The attachment is strong and will retain the hearing aid so that it cannot fall and become damaged from impact with a hard surface and to prevent the hearing aid from being lost.

It is an object of the present invention to provide a safety device to retain a hearing aid on the person of the wearer so that it cannot be lost or damaged.

It is a further object of the present invention to provide a safety device that is virtually invisible so as not to call attention to the hearing aid.

Another object of the present invention is to have a safety device that can be securely and reversibly attached to any hearing aid.

A further object of the present invention is to provide a safety device that is easy to attach to or to remove from the hearing aid itself and to attach to and remove from the retaining article on the person of the wearer.

A still further object of the present invention is to provide a safety device that cannot slip from the retaining article.

It is another object of the present invention to provide a safety device that is inexpensive to manufacture.

The invention is a safety device for the retention of a hearing aid of a type worn in or about the ear of a wearer. The safety device comprises a two part attachment system having a first portion and a second portion, a transparent filament, and a securing plate. One end of the filament is integral with the second portion of the attachment system and the opposing end of the filament is integral with the securing plate. There is also a means for attaching the first portion of the attachment system to the hearing aid. When the first portion is attached to the hearing aid, the second portion is in cooperation with the first portion and the securing plate is retained on a retaining article on the person of the wearer the hearing aid cannot fall from the wearer and cannot be damaged or lost.

The invention is also a safety device for the retention of a hearing aid of a type having a behind the ear unit, a connecting member and an ear bud. The safety device comprises a two part attaching strip having a first portion for secure attachment to the behind the ear unit, the first portion having an outer surface and a cooperating inner surface, and a second portion having a cooperating surface that reversibly and securely attaches to the cooperating inner surface of the first portion. There is a transparent filament, and a securing plate. One end of the filament is integral with the second portion of the attaching strip and the opposing end of the filament is integral with the securing plate. There is also a means for securely attaching the outer surface of the first portion to the behind the ear unit. When the first portion is attached to the behind the ear unit, the second portion is in cooperation with the first portion and the securing plate is retained on a retaining article on the person of a wearer the hearing aid cannot fall from the wearer and cannot be damaged or lost.

The invention may also be described as a safety device for the retention of a hearing aid of a type including a behind the ear unit. The safety device comprises a two part attaching strip having a first portion with an inner surface and an outer surface and a cooperating second portion, a transparent filament, and a securing plate. One end of the filament is integral with the second portion of the attaching strip and the opposing end of the filament is integral with the securing plate. There is an adhesive layer disposed on the outer surface of the first portion for secure attachment of the first portion to the behind the ear unit. The securing plate comprises a flat surface with a central slit therein and a circumferential semi-rigid raised rim. The rim is compressible to open the slit to receive a retaining article worn on the person of a wearer.

Other features and advantages of the invention will be seen from the following description and drawings.

DETAILED DESCRIPTION OF THE INVENTION

Figure 1:
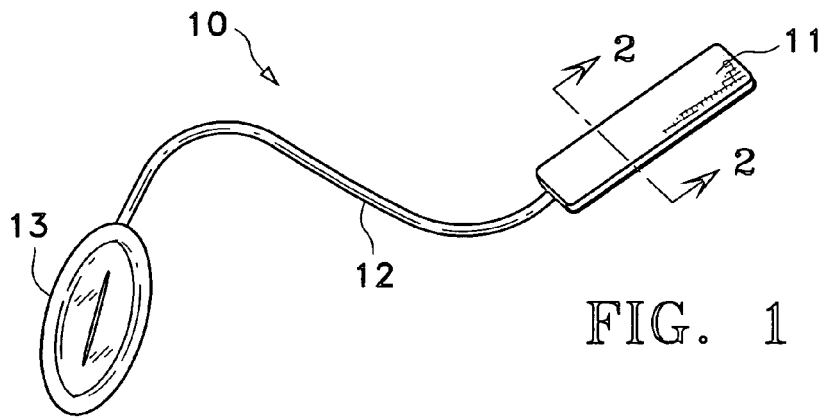
FIG. 1 is a perspective view of the device of the present invention.

The safety device 10 of the present invention may be designed to be used with a hearing aid assembly 14 of the type consisting of a behind the ear component 15 a connecting cable 16 and an ear bud 17. (See FIG. 4) The safety device 10 may have three essential integral parts, the attaching strip 11, the filament 12 and the securing plate 13 which can be seen in FIG. 1. All parts may be made of transparent materials which may make the device 10 virtually invisible so as not to call attention to the hearing aid.

The attaching strip 11 may be made of a two part cooperating system such that one part, a first portion 34, may be permanently attached to the behind the ear component 15 of the hearing aid 14. The second portion 35 may be detachable from the first portion 34 so the device 10 may be easily attached to or removed from the hearing aid at the convenience of the wearer. The second portion 35, may be integral with one end of the filament 12, the other end of which may be integral with the securing plate 13. See FIG. 4.

Figure 2:
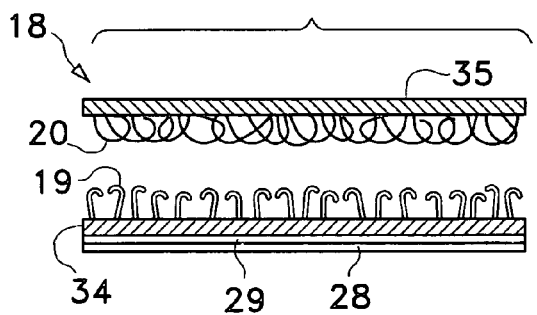
FIG. 2 is cross section through line 2-2 of FIG. 1 for hook and loop type fastener.
Figure 3:
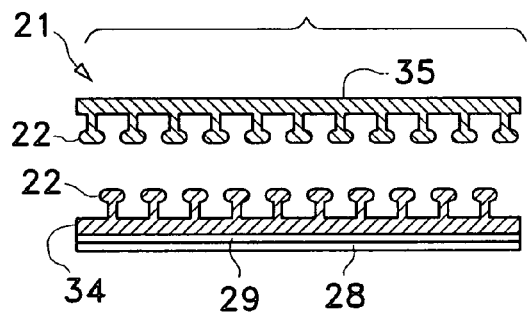
FIG. 3 is a cross section through line 2-2 of FIG. 1 for interlock fastener.
Figure 4:
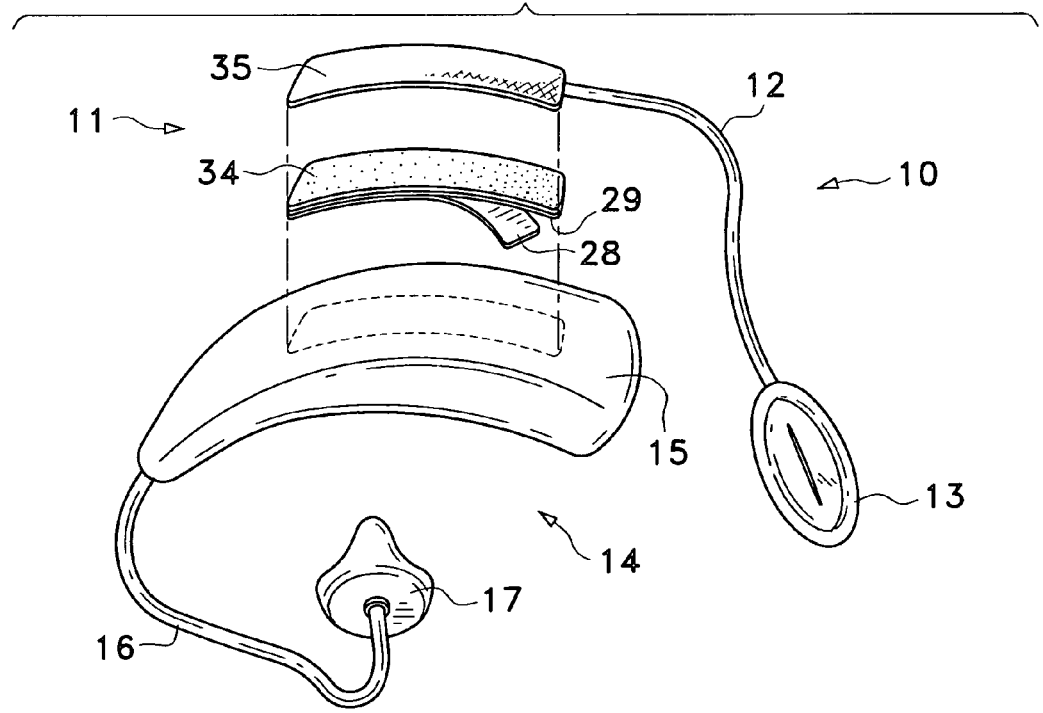
FIG. 4 is an exploded view of the device and hearing aid assembly.

The two part cooperating system may be of any construction, but two practical examples are hook and loop type fastener 18 (FIG. 2) and interlock fastener 21 (FIG. 3). Both of these systems are available in flexible sheets or strips with an adhesive 29 on one or both outer surfaces and a peel-off cover strip 28 over the adhesive 29. The sheets may be cut or manufactured in any desirable size and shape. For this device 10 an adhesive layer 29 may be needed on only the first portion of the two part system as seen in FIG. 4.

The device 10 of the present invention may be utilized with any hearing aid of the general type described above. The hearing aid does not have to have any attaching bar, loop or other means manufactured integral with its outer surface. When the device 10 is purchased, the wearer need only peel off the cover strip 28 and press the adhesive layer 29 on the first portion 34 of the two part attaching strip 11 against the surface of the curved behind the ear component 15 of the hearing aid 14 (FIG. 4). The first portion 34 may be positioned so that it does not make contact with the skin when the behind the ear component 15 is properly seated. Once the first portion 34 is affixed to the behind the ear component 15, the cooperating second portion 35 can easily be connected to the hearing aid by pressing the inner surfaces of the two portions 34,35 together. Thereafter, it may just as easily be removed from the behind the ear component 15 by pulling the two portions 34,35 apart. The first portion 34 may be permanently attached to and may remain on the behind the ear component 15 of the hearing aid 14 as noted above.

The interlock fastener system 21 (FIG. 3), such as that manufactured by 3M Corporation under the designation Low Profile Dual Lock fastener, may have advantages over the more common hook and loop type fastener 18. First, the inner surfaces of the two cooperating portions 22 are identical and when disengaged the surfaces are smooth and will not attach to or cause pilling of fabrics they may come into contact with, and second, the connection is somewhat tighter then with hook and loop fastener 18 and requires a bit more pressure for the two portions to be pulled apart. This may make for a stronger connection with less chance of the two portions being unintentionally separated. Hook and loop fastener 21 may be somewhat easier for use by a wearer with less manual dexterity and maneuverability.

The shape of the attaching strip 11 may also be important. Though the attaching strip 11 may be cut into any desirable shape or size, the larger the area of contact with the surface of the behind the ear component 14 of the hearing aid, the more secure may be the attachment. Since the behind the ear component 14 may be quite small and may rest closely between the side of the head and the back of the ear, the surface area that is not in contact with skin may be limited. The shape for the attaching strip 11 with the potential for the largest area of contact with the surface of the behind the ear component 14 may therefore be long and narrow. Thus, the strip 11 may preferably be oblong with the length far exceeding the width. (See FIGS. 1 and 4) It may be advantageous for the corners of an oblong strip to be rounded for better retention against the surface of the behind the ear component. The attaching strip 11 may also be oval.

As previously noted, one end of the filament 12 may be integral with one end of the second portion 35 of the attaching strip 11. The filament 12 may itself be very fine and transparent, much like the nylon filaments used for fishing line. Such a filament may be affixed to or fused to the second portion 35 of the attaching strip 11 by any method known in the art that produces a permanent and secure attachment. The length of the filament 12 may be short enough so that there is no slack but long enough so there may be no pulling or strain on the line when in use. Exact length may be determined according to the dimensions of the attaching strip 11, the securing plate 13, and the location of the retention article used by the wearer.

Since the opposing end of the filament 12 may be integral with the securing plate 13, the attachment of the filament 12 to the securing plate may also be accomplished by any permanent attachment means known in the art. The securing plate 13 may be substantially planar with a flat inner surface and a raised rim 24 around its entire circumference on both the obverse and reverse surfaces as may be seen in FIGS. 5 and 6. There may be a longitudinal slit 26 in the center of the flat inner surface 25 of the securing plate 13. The device 10 may be designed to be reversibly affixed to a retaining article worn on the person of the wearer. The device 10 may function optimally when affixed to the temple 31 of a pair of glasses 30. The slit 26 may be just long enough for the earpiece 32 of the temple 31 to be passed through it. To insure that the securing plate 13 cannot easily slip from the earpiece 32, the material of which the securing plate 13 is constructed may be of great importance.

Figure 7:
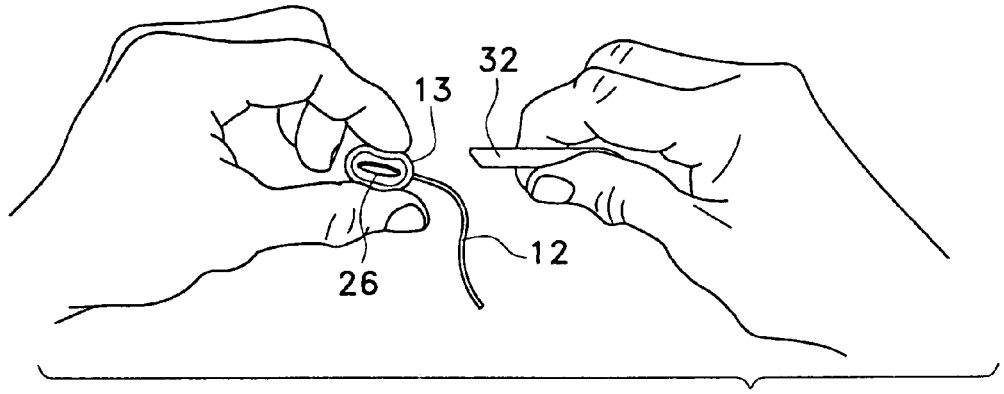
FIG. 7 is a front view showing how the securing plate is compressed to admit the ear piece.

The securing plate 13 may be composed of a semi-rigid polymeric or plastic material that may enable the inner surface 25 of the securing plate 13 to be somewhat thinner and more pliable than the circumferential raised rim 24. The circumferential raised rim 24 may be quite strong and may only distort under pressure such as may be applied from opposing sides of the rim and directed towards the center. This may be accomplished by grasping opposing edges between the thumb and index or middle finger and applying pressure. See FIG. 7. Under this pressure the securing plate 13 may distort just enough to cause the slit 26 to open so the earpiece 32 may be inserted therethrough. When the pressure is released the slit 26 may close and the earpiece 32 may be securely retained within the securing plate 13. Thus, the securing plate 13 may not slip from the earpiece 32 without having pressure applied again for its release.

Figure 5:
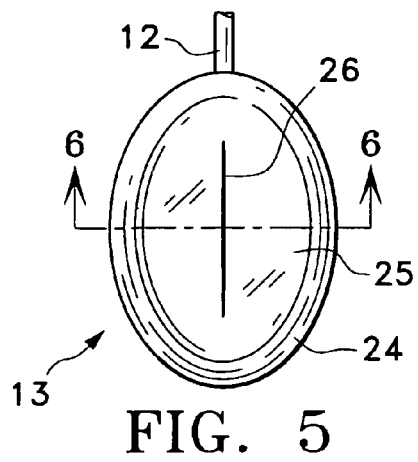
FIG. 5 is a plan view of the securing plate.
Figure 6:
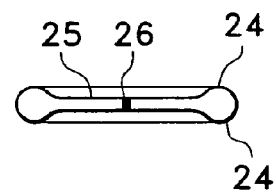
FIG. 6 is a cross section through line 6-6 of FIG. 5.

The shape of the securing plate 13 may also be important in meeting the goals of the device 10. Visibility and comfort may also be considered. The plate 13 must be long enough so that the slit 26 may be opened sufficiently under side pressure to admit the earpiece 32. However, the width of the plate 13 need only provide a small surface 25 on each side of the slit 26. The best shape for the plate 13 may be oval as seen in FIG. 5 or oblong. If oblong, it may be preferable for the corners to be rounded for the comfort of the wearer. The securing plate 13 may also be round.

Figure 8:
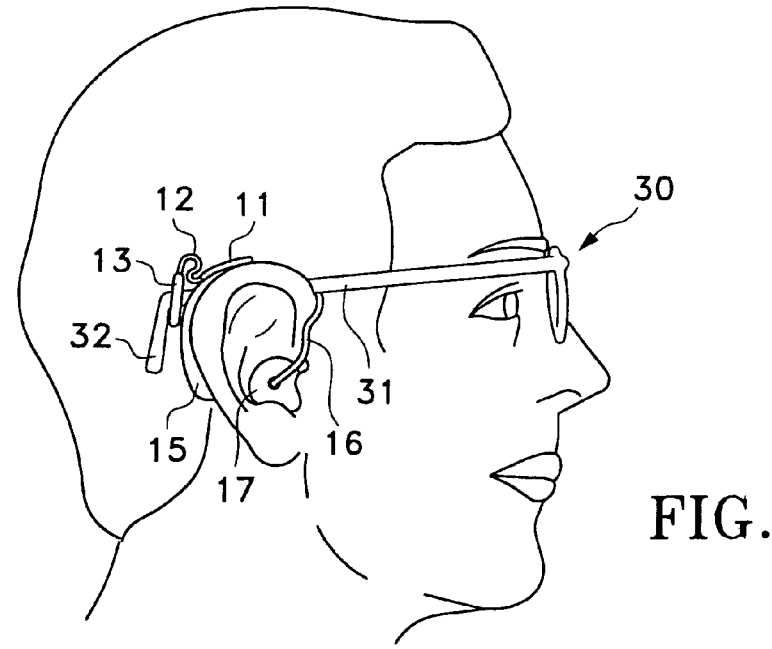
FIG. 8 is a side plan view of a wearer with the hearing aid and device in place.

In use, the adhesive backed first portion 34 may be affixed to the behind the ear component 15 of the hearing aid 14 as the first step. The device 10 may thereafter be attached to the hearing aid 14 by uniting the two portions 34,35 of the connecting strip 11. This may be accomplished either before or after the glasses 30 are put on. It may also be possible for the device 10 to remain on the temple 31 of the glasses 30 and the hearing aid 14 detached therefrom when the glasses 30 are removed. The securing plate 13 may be worn in back of the ear or in front of the ear according to the comfort of the wearer. The securing plate 13 may, of course, be less visible when worn behind the ear as seen in FIG. 8. The securing plate 13 may be made of a transparent material so that it may be virtually invisible when in place either in front or in back of the ear.

Typically, the wearer of a hearing aid may use an individual hearing aid assembly 14 in each ear. Therefore, one device 10 of the present invention may be used for each hearing aid assembly 14. The securing plates 13 for the devices 10 used with the hearing aid assemblies 14 worn on each ear may be placed on the temples 31 of the glasses 30 before the glasses are put on. Once the glasses 30 are in place, the hearing aids 14 may be placed behind the ears, the two portions 34, 35 of the attaching strips 11 may be joined and the devices 10 may maintain the security of the hearing aids 14.

The securing plate 13 of the device 10 of the present invention may also be affixed to a retaining article other than glasses 30 such as an article of jewelry. Post earrings or a neck chain can be used by inserting the post or one end of the chain through the slit 26 in the securing plate 13 in the manner described above. For either of these usages the length of the filament may be somewhat greater then needed when the device 10 is affixed to the temples 31 of glasses 30.

The device 10 of the present invention may also be utilized to retain and protect an unattached ear bud that may not be a part of a more complex hearing aid assembly. If an ear bud is to be protected, the attaching strip 11 may be quite small, with just enough surface area to adhere to a smooth portion of the ear bud.

The flexibility of the filament 12 and the size and shape of the securing plate 13 may insure that the device 10 causes no discomfort to the wearer. The transparency of the components of the device 10 may also insure that while worn, the device may remain inconspicuous and may not call any attention to the presence of the hearing aid.

The device 10 of the present invention may be sold singly, but sets of two may be more practical since most wearers use a hearing aid in each ear. There may also be packages containing more than one set, each set having a filament of a different length so the wearer may have a choice as to the selection of a retaining article.

While one embodiment of the present invention has been illustrated and described in detail, it is to be understood that this invention is not limited thereto and may be otherwise practiced within the scope of the following claims.

I claim:

1. A safety device for the retention of a hearing aid of a type worn in or about the ear of a wearer, said safety device comprising:
   a two part attachment system having a first portion and a cooperating second portion, a transparent filament, and a securing plate, one end of said filament being integral with the second portion of the attachment system and the opposing end of said filament being integral with the securing plate; and
   means for attaching the first portion of the attachment system to the hearing aid;
whereby when the first portion is attached to the hearing aid, the second portion is in cooperation with the first portion and the securing plate is retained on a retaining article on the person of the wearer the hearing aid cannot fall from the wearer and cannot be damaged or lost.

2. A safety device for the retention of a hearing aid of a type having a behind the ear unit, a connecting member and an ear bud, said safety device comprising:
   a two part attaching strip having a first portion for secure attachment to the behind the ear unit, said first portion having an outer surface and a cooperating inner surface, and a second portion having a cooperating surface that reversibly and securely attaches to the cooperating inner surface of the first portion, a transparent filament, and a securing plate, one end of said filament being integral with the second portion of the attaching strip and the opposing end of said filament being integral with the securing plate; and
   means for securely attaching the outer surface of the first portion to the behind the ear unit;
whereby when the first portion is attached to the behind the ear unit, the second portion is in cooperation with the first portion and the securing plate is retained on a retaining article on the person of a wearer the hearing aid cannot fall from the wearer and cannot be damaged or lost.

3. A safety device as described in claim 2 wherein the two part attaching strip is transparent.

4. A safety device as described in claim 2 wherein the securing plate is transparent.

5. A safety device as described in claim 2 wherein the two part attaching strip comprises hook and loop fastener.

6. A safety device as described in claim 2 wherein the two part attaching strip comprises an interlock fastener wherein both parts are identical.

7. A safety device as described in claim 2 wherein the means for securely attaching the first portion to the behind the ear unit is an adhesive layer disposed on the outer surface of the first portion.

8. A safety device as described in claim 7 further comprising a protective peel-off strip disposed over the adhesive layer, said strip being removed when the first portion is affixed to the surface of the behind the ear unit.

9. A safety device as described in claim 2 wherein the attaching strip is dimensioned to be placed on an exposed surface of the behind the ear unit of the hearing aid.

10. A safety device as described in claim 2 wherein the securing plate has a flat inner surface with a central longitudinal slit therein and a raised rim about its circumference.

11. A safety device as described in claim 10 wherein the securing plate is composed of a semi-rigid polymeric material such that when opposing edges of the rim are compressed toward the center the slit is opened to admit the retaining article and when the compression is removed the slit closes to securely retain the retaining article therewithin such that it cannot slip out and the hearing aid cannot fall from the person of the wearer.

12. A safety device as described in claim 11 wherein the retaining article is the temple of a pair of glasses.

13. A safety device for the retention of a hearing aid of a type having a behind the ear unit, said safety device comprising:
   a two part attaching strip having a first portion with an inner surface and an outer surface and a cooperating second portion, a transparent filament, and a securing plate, wherein one end of the filament is integral with the second portion of the attaching strip and the opposing end of the filament is integral with the securing plate;
   an adhesive layer disposed on the outer surface of said first portion for secure attachment of the first portion to the behind the ear unit; and
   said securing plate comprising a flat surface with a central slit therein and a circumferential semi-rigid raised rim, said rim being compressible to open said slit to receive a retaining article worn on the person of a wearer.

14. A safety device as described in claim 13 further comprising a protective peel-off strip disposed over the adhesive layer, said strip being removed when the first portion is affixed to the surface of the behind the ear unit.

15. A safety device as described in claim 13 wherein the two part attaching strip is transparent.

16. A safety device as described in claim 13 wherein the securing plate is transparent.

17. A safety device as described in claim 13 wherein the two part attaching strip comprises hook and loop fastener.

18. A safety device as described in claim 13 wherein the two part attaching strip comprises an interlock fastener wherein both parts are identical.

\* \* \* \* \*